United States Patent [19]
Fasulo et al.

[11] Patent Number: 5,248,718
[45] Date of Patent: Sep. 28, 1993

[54] FLAME-RETARDANT THERMOPLASTIC STYRENIC COMPOSITION CONTAINING A CHLORINATED HYDROCARBON, AN INORGANIC OXIDE AND PTFE

[75] Inventors: Gian C. Fasulo, Mantova; Francesco Mori, Verona; Roberto Nocci, Mantova; Italo Borghi, Ferrara, all of Italy

[73] Assignee: ECP Enichem Polimeri S.r.l., Milan, Italy

[21] Appl. No.: 868,115

[22] Filed: Apr. 14, 1992

[30] Foreign Application Priority Data

Apr. 19, 1991 [IT] Italy ............................. 001092 A/91

[51] Int. Cl.$^5$ .................... C08J 5/10; C08K 3/10; C08K 3/16; C08L 25/04
[52] U.S. Cl. ..................... 524/412; 524/408; 524/409; 524/411; 524/341
[58] Field of Search ............... 524/408, 411, 412, 341, 524/409

[56] References Cited

U.S. PATENT DOCUMENTS

| | | | |
|---|---|---|---|
| 4,355,126 | 10/1982 | Haaf et al. | 524/411 |
| 4,732,921 | 3/1988 | Hochberg et al. | 523/460 |
| 4,749,745 | 6/1988 | Biglione et al. | 525/146 |

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

Flame-retardant thermoplastic composition including a styrene polymer containing thoroughly incorporated therein an effective quantity of a synergetic mixture composed of a chlorinated hydrocarbon compound containing at least 40% by weight of combined chlorine, an inorganic compound containing oxygen of a metal belonging to group III or IV of the periodic table, and polytetrafluoroethylene having a particle size which is less than 20 microns.

16 Claims, No Drawings

FLAME-RETARDANT THERMOPLASTIC STYRENIC COMPOSITION CONTAINING A CHLORINATED HYDROCARBON, AN INORGANIC OXIDE AND PTFE

The present invention relates to a flame-retardant thermoplastic composition.

More specifically, the present invention relates to a flame-retardant thermoplastic composition, based on styrene polymers, having excellent flow properties, satisfactory operating stability and no formation of toxic combustion products.

Styrene polymers and their use are well-known in the art, such as for example Polystyrene W. C. Teach and G. C. Kiessling (Reinhold Plastics Applications Series), Reinhold Publ. Corp. New York, 1960 and Modern Plastics Encyclopedia 1972-1973 Vol. 49: No. 10A, October 1972 pages 97-99, 161 and 271-27.

It is also well-known in the art that styrene polymers, like most other synthetic resins, burn very easily and spread flames. This disadvantage enormously limits the fields of application of styrene polymers.

In order to reduce or prevent the flammability of these polymers it is commonly used to incorporate certain additives generally known as flame-retardant agents into the polymer.

In the presence of these agents, combustion is delayed or even entirely prevented owing to various action mechanisms. Flame-retardants which act chemically, interfering with the radical reactions of the combustion process are more commonly used.

The halogenated derivatives of organic compounds, such as chloroparaffins, hexa-halo-benzenes, penta-bromo-diphenyl, pentabromo-diphenyl-ether, deca-bromo-diphenyl-oxide or octabromo-diphenyl are widely used for the purpose. In many cases, the effectiveness of these halogenated derivatives can be further increased by an additional incorporation of suitable synergetic inorganic compounds, such as, for example, antimonium trioxide.

A disadvantage, however, of these known flame-retardant agents or combination of compounds is that they very often negatively change some of the properties of the polymer. In fact, a substantial decrease in the impact strength, elongation and aging-resistance as well as in the operating stability can be observed in the polymers to which these flame-retardant agents have been added.

Furthermore, some of these flame-retardant agents develop toxic substances during the processing and/or combustion, as described in CHEMOSPHERE—Vol. 15 N. 5 pages 649-652, 1989 and Vol. 18—N. 1-6 pages 1235-1242, 1989.

Apart from chemical inhibition, the burning sample can also be extinguished by separation of the burning part in the form of drops either burning or not burning. The molten polymer drips if the viscosity of the polymer at the combustion temperature is sufficiently low. In this case, the flame-retardant agent acts as a lubricant or induces the degradation of the polymer at a higher temperature accompanied by a decrease in the viscosity. The activity of a flame-retardant agent is complex and various mechanisms operate simultaneously.

Various procedure regulations require that the burning drops do not inflame the organic material (for example cotton, wool), onto which they drip. Consequently, apart from the change in viscosity, additives having a simultaneous inhibiting effect on the radical combustion reactions are preferred. Compound which effectively decrease the viscosity of the polymer at the combustion temperature and at the same time chemically inhibit the combustion reaction can be used in much lower concentrations resulting in a considerable saving in costs. In addition, in this case, the decrease in important mechanical properties such as impact strength or elongation is lower compared to that which occurs with flame-retardants which are exclusively inhibitors of free radicals.

The flame extinction mechanism is considered in the flammability classification of polymers in accordance with standard regulations. The most commonly used is the extremely rigorous vertical UL-94 test (developed by Underwriters' Laboratories, USA). According to this test, materials which can be extinguished by the dripping of the burning melt are classified in category V-2 in case of burning of surgical cotton by the enflamed drops. Plastic materials classified as V-2 are not suitable for certain applications, for example when the burning drops may cause public damage.

The disadvantage of many flame-retardant agents of this kind is that the degradation of the polymer, which favours the extinction of the fire by means of dripping, very often begins to a considerable extent at the operating temperature of the polymer. This phenomenon is totally undesirable if the good properties of the modified polymer are to be preserved.

The Applicant has now found a new synergistic combination of flame-retardant agents which, incorporated into the styrene polymers, gives high flame-retardant values, which can be classified according to the method of Standard regulation UL-94 in category V-0, without negatively influencing the physical-mechanical, flow and stability properties of the polymers.

This synergetic combination basically consists of:
(i) a hydrocarbon compound containing at least 40% by weight of combined chlorine;
(ii) an inorganic compound containing oxygen of a metal belonging to group III, IV, V or VI of the Periodic Table, and
(iii) polytetrafluoroethylene (PTFE) in powder form having a particle size which is less than 20 microns.

The present invention consequently relates to a flame-retardant thermoplastic composition basically consisting of a styrene polymer in which an effective quantity of a synergistic mixture is thoroughly incorporated, composed of:
(i) a chlorinated hydrocarbon compound containing at least 40% by weight of combined chlorine;
(ii) an inorganic compound containing oxygen of a metal belonging to group III, IV, V or VI of the Periodic Table, and
(iii) polytetrafluoroethylene (PTFE) in powder form having a size which is less than 20 microns.

In the synergetic mixture of the present invention, the quantity of polytetrafluoroethylene is very low and, generally less than 5% by weight with respect to the sum of the three components (i), (ii) and (iii), quantities of between 0.1 and 3% being preferred.

The quantities of chlorinated hydrocarbon compound (i) and inorganic compound containing oxygen (ii) can vary within a wide range; generally the weight ratio between the chlorinated hydrocarbon compound (i) and the inorganic compound containing oxygen (ii) ranges from 10:1 to 1:1, preferably from 5:1 to 2:1.

The synergetic mixture of stabilizers is added to the styrene polymer in sufficient quantities to obtain the required flame-retardant effect; the quantity of synergistic mixture added is generally higher than 10% by weight and preferably between 20 and 30%, with respect to the total weight of the composition, especially when a flame-retardant effect classified, in accordance with the method of Standard regulation UL-94, under category V-0 is required for thicknesses of the end product of less than 2 mm.

In accordance with the present invention, a preferred flame-retardant thermoplastic composition with good flow properties, satisfactory operating stability, even at high temperatures, and without the formation of toxic combustion products, includes:

from 84.9 to 70% by weight, with respect to the composition, of a styrene polymer;

from 10 to 70% by weight, with respect to the composition, of a chlorinated hydrocarbon compound (i) containing at least 40% by weight of combined chlorine;

from 5 to 9.5% by weight, with respect to the composition, of an inorganic compound containing oxygen (ii) of a metal belonging to group III IV, V or VI of the Periodic Table; and from 0.1 to 0.5% by weight, with respect to the composition, of polytetrafluoroethylene (PTFE) (iii) in powder form having a particle size smaller than 20 microns.

The term "styrene polymers", as used in the present description and claims, refers to any solid, thermoplastic polymer, and relative copolymer, composed either totally or for the most part, i.e. containing a chemically bound quantity of at least 50% by weight, of one or more styrene or vinyl aromatic compounds having the general formula:

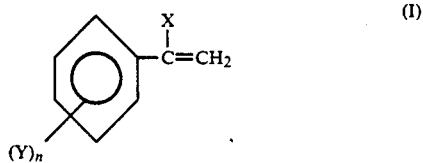

(I)

wherein X represents hydrogen or an alkyl radical having from 1 to 4 carbon atoms; n is zero or an integer between 1 and 5 and Y represents halogen or an alkyl radical having from 1 to 4 carbon atoms.

Examples of styrene or vinyl-aromatic compounds having the above general formula are: styrene; methylstyrene; mono-, di-, tri-, tetra- and penta-chloro-styrene and the corresponding alpha-methyl-styrenes; styrenes alkylated in the nucleus and the corresponding alpha-methyl-styrenes such as ortho and para-methyl-styrenes, ortho and para-ethyl-styrenes; ortho- and para-methyl-alpha-methyl-styrenes, etc.

These monomers can be used alone or mixed with each other or with other copolymerizable ethylenically unsaturated comonomers such as, for example, maleic anhydride, acrylonitrile, methacrylonitrile, $C_1$–$C_4$ alkyl esters of acrylic or methacrylic acid etc., in quantities of up to 50% by weight.

The term styrene polymers also includes the above polymers and copolymers modified with rubber to form impact-strength polymers.

The rubber can be either natural or synthetic such as polybutadiene, high, medium cis and low viscosity polybutadiene, polyisoprene, the copolymers of butadiene and/or isoprene with styrene or other monomers, ethylenepropylene, ethylene-propylene-diene (EPDM), conjugated styrene-diene monomer linear block rubbers of the type B/S or S-B/S, wherein S are polymer blocks based on a styrene monomer and B/S are random and/or tapered copolymers of conjugated styrene or diene monomer, having a styrene monomer content of between 20 and 60% by weight and proportionately, between 80 and 40% by weight of units of a conjugated diene.

The rubber component is present in the impact-resistant styrene polymer in quantities of between 5 and 20% by weight and can be of a single type or a mixture of different rubbers.

Polystyrene modified with a mixture composed of 90-99% by weight of polybutadiene and 10-1% by weight of a B/S or S-B/S linear block polymer mentioned above, is preferred.

The preparation of the styrene polymer may be carried out following any of the known polymerization processes in suspension, mass-suspension or in continuous mass.

A critical important aspect of the chlorinated hydrocarbon compound (i), used in the synergetic mixture of flame-retardant agents of the present invention, is that it must have a content of combined chlorine of at least 40% and preferably at least 60% by weight and up to exhaustive chlorination, of 73.1%, corresponding to the formula $C_nH_{n+2}Cl_n$. The hydrocarbon compounds generally of the saturated type and with a basically linear configuration, containing from 10 to 30 carbon atoms (n=10-30).

Component (i) is preferably a linear saturated hydrocarbon containing from 20 to 24 carbon atoms and with a content of combined chlorine of between 65 and 72% by weight.

Chlorinated hydrocarbons are viscous liquids or resinous solids with a low boiling point, mainly depending on the type of paraffinic starting material and on the percentage of chlorine inserted into the molecule.

These chlorinated hydrocarbon compounds (i) are produced commercially, within a wide range of properties, and are known on the market for example under the following trade-names: THERMOGUARD ® sold by the company ATO; HORDAFLAM ® sold by Hoechst; CLOPARIN ® sold by Caffaro; CHLORO-WAX ® sold by Occidental Chemical Corp.

The inorganic compound containing oxygen (ii) of a metal of group III, IV, V or VI of the Periodic Table may be oxide, hydroxide, carbonate, silicate, molybdate or more complicated compound of the relative metals, such as various minerals.

Typical examples are specifically antimonium trioxide ($Sb_2O_3$), aluminium oxide, hydrous aluminium oxide, molybdenum trioxide, kaolin, $H_4SiO_4$, hydrous tin oxide, $2ZnO.3B_2O_3.3.5H_2O$, ZnO, $TiO_2$, $As_2O_3$, $As_2O_5$, $ZnBO_4$, SbOCl, etc. $Sb_2O_3$ is preferred.

The polytetrafluoroethylene (PTFE), which is the third component (iii) of the flame-retardant synergetic mixture of the present invention, is used in very fine powder form having an average diameter of less than 20 microns and preferably between 5 and 0.1 microns. This polymer (PTFE) can be obtained by means of a polymerization process in a dispersion of tetrafluoroethylene, in the presence of organic and inorganic peroxidic catalysts at pressures ranging from 10 to 200 Atm and at temperatures ranging from 0° to 200.C.

Provided that the form and size of the particles are appropriate, any type of PTFE can be used in the synergetic mixture of the present invention. Suitable types of PTFE may be: those produced by E. I. Du Pont de Nemours and Company and sold under the trade-name of TEFLON ®; those produced by Montefluos under the trade-name of ALGOFLON ®, those produced by I.C.I. under the trade-name of FLUON ®. These PTFEs can be homopolymers or copolymers of PTFE with a high copolymerizable monomer where the PTFE is present as the greatest constituent in the copolymer, preferably at a level of at least 80% b.w.

The mixtures of the present invention can be prepared using any of the conventional mixing procedures.

The mixing is generally carried out in the molten state, using well-known equipment such as single and twin-screw extruders, Banbury mixer, mixing rollers etc. at temperatures of between 170° and 220° C.

The components of the composition can be premixed at room temperature or added separately or combined with each other during the extrusion process.

The compositions may also contain stabilizers, antiacids and/or other additives thoroughly incorporated, such as plasticizers, lubricants, flow agents, antistatic agents, dyes, pigments, glass fibers or other inorganic fillers etc. to give the material specific characteristics.

The mixtures of the present invention are easily processable, especially by means of injection moulding, and have a series of properties which make them suitable to be used for the preparation of products having good mechanical and excellent non-flammability characteristics. These mixtures may consequently be applied in the fields of electronics and technical articles which are destined to come into contact with sources of heat, and/or electric voltage.

The following examples provide a better illustration of the present invention but do not limit it in any way.

In the examples, all parts and percentages are by weight unless otherwise specified.

EXAMPLES 1-4

The following products were mixed in a rotating-drum mixer, at room temperature:
impact-resistant polystyrene containing 7.5% by weight of polybutadiene rubber and having a molecular weight of 170,000, in the quantities shown in Table I;
a chloroparaffin (i) produced and sold by ATO under the trade-name of THERMOGUARD ®, in the quantities shown in Table I;
$Sb_2O_3$ (ii) in the quantities shown in Table I; and
PTFE (iii) produced and sold by Montefluos under the trade-name of ALGOFLON, in powder form having an average diameter shown in Table I and in the quantities specified in the same Table.

The mixtures thus obtained were dried at 80° C. for 4 hours and extruded by means of a single-screw BANDERA TR45 extruder, with a length/diameter ratio of 25, with degassing, at a temperature of 180° C.

The spaghetti were cut on leaving the extruder producing granules which were dried for 4 hours at 80° C. To determine their characteristics, the pellets are injection moulded at a temperature of 180°-200° C. on a NEGRI & BOSSI V-17-110 FA press to obtain test samples having the dimensions required by regulation.

The properties measured on the test samples thus obtained are shown in Table I below.

The following methods were used to measure the characteristics of the blends of the present invention.

Flame-retardant property

The flammability was determined in accordance with the "Underwriters's Laboratory" method nominated UL 94 described in "Standard For Tests for Flammability of Plastic Materials For Parts in Devices and Appliances" 3 Edition, Jan. 28, 1980, on test samples having dimensions of 127×12, 7×1,59 mm (5"×.05"×0.0625").

Mechanical Properties

The IZOD notch resilience was determined at 23° C., in accordance with regulation ASTM D256, on test samples having a thickness of 3.2 mm, together with the tensile strength, ultimate elongation and elastic modulus in accordance with regulation ASTM D 638.

Thermal Properties

The VICAT B softening temperature (5 Kg in oil) was determined, in accordance with regulation ISO 306, with a temperature increase of 50° C./hour.

The Melt-Index was determined in accordance with regulation ASTM D 1238, at 200° C. and 5 Kg.

TABLE I

| COMPOSITION | QUANTITY | EXAMPLE NUMBER | | | |
|---|---|---|---|---|---|
| | | 1* | 2* | 3 | 4 |
| Shock resistant polystyrene | % by weight | 77 | 77 | 77 | 73.5 |
| THERMOGUARD ® | % by weight | 17.6 | 17.6 | 17.6 | 20 |
| $Sb_2O_3$ | % by weight | 5.4 | 5.4 | 5.4 | 6.5 |
| ALGOFLON ® | | | | | |
| Dimension: .500-700 μm | parts by weight | — | 0.3 | — | — |
| less than 5 μm | parts by weight | — | — | 0.3 | 0.1 |
| FLAME RETARDANT PROPERTIES | UNIT | | | | |
| UL 94 | | V2 | V2 | V0 | V0 |
| MECHANICAL PROPERTIES | | | | | |
| IZOD | J/m | 60 | 58 | 58 | 76 |
| Yield strength | MPa | 26.5 | 26 | 26 | 23 |
| Breaking load | MPa | 21 | 21.5 | 21.5 | 23 |
| Ultimate elongation | % | 25 | 30 | 30 | 26 |
| Elastic modulus | MPa | 2150 | 2200 | 2200 | 1800 |
| THERMAL PROPERTIES | | | | | |
| VICAT | °C. | 86.5 | 87 | 87 | 81 |
| RHEOLOGICAL PROPERTIES | | | | | |
| M.F.I. | g/10' | 9.8 | 10 | 10 | 11.2 |

*Comparative example

EXAMPLES 5-6

Operating under the same conditions as Example mixtures were prepared using an impact-resistant polystyrene having a molecular weight of 170,000, containing, dispersed in the polymeric matrix, 7.5% by weight of polybutadiene rubber and 4% by weight of an S-B/S linear block polymer (CARIFLEX ® T 1102 produced and sold by SHELL) containing 30% of styrene and 70% of butadiene and having a molecular weight of 75,000.

The compositions of the mixtures and their relative properties are shown in Table II below.

TABLE II

| COMPOSITION | QUANTITY | EXAMPLE NUMBER 5 | 6 |
| --- | --- | --- | --- |
| Shock resistant polystyrene | % by weight | 73.5 | 73.5 |
| THERMOGUARD ® | % by weight | 20 | 20 |
| $Sb_2O_3$ | % by weight | 6.5 | 6.5 |
| ALGOFLON ® | | | |
| Dimension: less than 5 μm | parts by weight | 0.1 | — |
| about 0.1 μm | parts by weight | — | 0.2(*) |
| FLAME RETARDANT PROPERTIES | UNIT | | |
| UL 94 | | V0 | V0 |
| MECHANICAL PROPERTIES | | | |
| IZOD | J/m | 88 | 88 |
| Yield strength | MPa | 27 | 27 |
| Breaking load | MPa | 25 | 25 |
| Ultimate elongation | % | 18 | 18 |
| Elastic modulus | MPa | 2000 | 2000 |
| THERMAL PROPERTIES | | | |
| VICAT | °C. | 82 | 82 |
| RHEOLOGICAL PROPERTIES | | | |
| M.F.I. | g/10' | 11.6 | 11.6 |

(*) = Added as aqueous dispersion at 60% by weight of ALGOFLON ®

EXAMPLE 7

Operating under the same process conditions as Example 1, a mixture is prepared composed of:
73.5% by weight of impact-resistant polystyrene, having a molecular weight of 170,000, containing, dispersed in the polymeric matrix, 7.5% by weight of polybutadiene rubber and 5% by weight of an S-B/S linear block polymer (EUROPRENE ® SOL T 168 produced and sold by Enichem Elastomeri S.p.A.) containing 60% of butadiene and 40% of styrene and having a molecular weight of 75,000;
20% by weight of chloroparaffin (THERMOGUARD ® of ATO);
6.5% by weight of $Sb_2O_3$, and
0.2 parts by weight of PTFE (ALGOFLON ® of Montefluos) having an average diameter of 0.1 μm.

The properties of the mixture obtained are:

| | | |
| --- | --- | --- |
| Flame-retardant Property: | UL 94 | V0 |
| Mechanical Properties: | IZOD | 91 J/m |
| | Yield strength | 24 MPa |
| | Breaking load | 23 MPa |
| | Ultimate elongation | 21% |
| | Elastic modulus | 1950 MPa |
| Thermal Properties: | VICAT | 81° C. |
| Rheological Properties: | M.F.I. | 16 g/10" |

We claim:

1. A flame-retardant thermoplastic composition, consisting of:
a styrene polymer prepared by polymerizing at least one member selected from the group consisting of styrene and vinyl aromatic compounds of the formula:

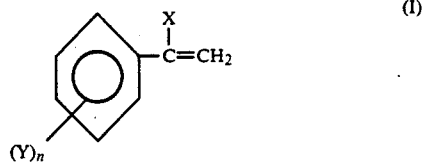

wherein X is hydrogen or $C_{1-4}$ alkyl, n is 0 or an integer of 1 to 5 and Y is halogen or $C_{1-4}$ alkyl, optionally with at least one other copolymerizable monomer selected from the group consisting of maleic anhydride, (meth)acrylonitrile, and a $C_{1-4}$ consisting of maleic anhydride, (meth)acrylonitrile, and a $C_{1-4}$ alkyl ester of (meth)acrylic acid or one of said styrene (co)polymers modified with rubber, having incorporated therein a flame-retardant effective amount of a synergistic mixture constituted of:

(i) a chlorinated hydrocarbon compound containing at least 40% by weight of combined chlorine;
(ii) an inorganic compound containing an oxide of a metal belonging to group III, IV, V or VI of the Periodic Table; and
(iii) polytetrafluoroethylene (PTFE) having a particle size smaller than 20 micrometers.

2. The thermoplastic composition of claim 1, wherein the quantity of polytetrafluoroethylene is less than 5% by weight with respect to the sum of the three components (i), (ii) and (iii).

3. The thermoplastic composition of claim 1, wherein the weight ratio of chlorinated hydrocarbon compound (i) to inorganic compound containing oxygen (ii) ranges from 20:1 to 1:1.

4. The thermoplastic composition of claim 1, wherein the quantity of polytetrafluoroethylene in the synergistic mixture ranges from 0.1 to 3% by weight with respect to the sum of the three components (i), (ii) and (iii).

5. The thermoplastic composition of claim 3, wherein the weight ratio of chlorinated hydrocarbon compound (i) to inorganic compound containing oxygen (ii) ranges from 5:1 to 2:1.

6. The thermoplastic composition of claim 1, wherein the quantity of said synergistic mixture is greater than 10% by weight with respect to the total weight of the composition.

7. The thermoplastic composition of claim 6, wherein said quantity of synergistic mixture ranges from 20 to 30% by weight.

8. The thermoplastic composition of claim 1, which comprises:
from 84.9 to 70% by weight, with respect to the total weight of composition, of said styrene polymer;
from 10 to 20% by weight, with respect to the total weight of the composition, of a chlorinated hydrocarbon compound (i) containing at least 40% by weight of combined chlorine;
from 5 to 9.5% by weight, with respect to the total weight of composition, of an inorganic compound (ii) containing an oxide of a metal of group III, IV, V or VI of the Periodic Table; and
from 0.1 to 0.5% by weight, with respect to the total weight of the composition, of polytetrafluoroethylene (PTFE) (iii) having a particle size smaller than 20 micrometers.

9. The thermoplastic composition of claim 1, wherein the styrene is modified with 5–20% by weight of a rubber selected from the group consisting of: polybutadiene, polyisoprene, copolymers of butadiene and/or of isoprene with styrene or with other monomers, ethylene-propylene, ethylene-propylene-diene (EPDM), B/S or S-B/S conjugated styrene-diene monomer linear block rubbers wherein S is polymeric blocks based on styrene monomer and B/S is random and/or tapered blocks of copolymers of styrene or conjugated diene monomer, having a styrene monomer content ranging from 20 to 60% by weight and, proportionately, from 80 to 40% by weight of units of a conjugated diene, and their mixture.

10. The thermoplastic composition of claim 9, wherein the styrene polymer is polystyrene modified with a mixture of rubber composed of 90-99% by weight of polybutadiene and 10–1% by weight of a B/S or S-B/S linear block polymer.

11. The thermoplastic composition of claim 1, wherein the chlorinated hydrocarbon compound contains at least 60% by weight an up to exhaustive chlorination of combined chlorine.

12. The thermoplastic composition of claim 11, wherein the chlorinated hydrocarbon compound is a basically linear saturated hydrocarbon having from 10 to 30 carbon atoms and having a content of combined chlorine ranging from 65 to 72% by weight.

13. The thermoplastic composition of claim 12, wherein said linear saturated hydrocarbon has from 20 to 24 carbon atoms.

14. The thermoplastic composition of claim 1, wherein the inorganic oxide compound (ii) is $Sb_2O_3$.

15. The thermoplastic composition of claim 1, wherein the polytetrafluoroethylene has a particle size ranging from 5 to 0.1 microns.

16. The thermoplastic composition of claim 1, which further comprises at least one member selected from the group consisting of addition stabilizers, antiacid agents, plasticizers, lubricants, flow agents, antistatic agents, pigments, glass fibers, other inorganic material and combinations thereof.

* * * * *